United States Patent
Thomas et al.

(10) Patent No.: US 12,246,668 B2
(45) Date of Patent: Mar. 11, 2025

(54) MOTOR VEHICLE WITH SELECTIVE AIRBAG SUPPRESSION BASED ON OCCUPANT POSITION AND SEATBELT USAGE

(71) Applicant: GM GLOBAL TECHNOLOGY OPERATIONS LLC, Detroit, MI (US)

(72) Inventors: Scott D. Thomas, Novi, MI (US); Lisa M. Furton, Beverly Hills, MI (US); Dorel M. Sala, Troy, MI (US); George D. Allen, Rochester Hills, MI (US); Sean T. Coughlin, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 18/080,830

(22) Filed: Dec. 14, 2022

(65) Prior Publication Data
US 2024/0198944 A1 Jun. 20, 2024

(51) Int. Cl.
*B60R 21/015* (2006.01)
*B60R 21/01* (2006.01)
*B60R 21/0136* (2006.01)

(52) U.S. Cl.
CPC .... *B60R 21/01544* (2014.10); *B60R 21/0136* (2013.01); *B60R 2021/01013* (2013.01); *B60R 2021/01211* (2013.01)

(58) Field of Classification Search
CPC ......... B60R 21/01544; B60R 21/0136; B60R 2021/01013; B60R 2021/01211
USPC .......................................................... 701/45
See application file for complete search history.

(56) References Cited

U.S. PATENT DOCUMENTS

| | | | | |
|---|---|---|---|---|
| 5,446,661 | A * | 8/1995 | Gioutsos | B60R 21/01534 340/436 |
| 6,373,146 | B2 * | 4/2002 | Horikoshi | B60R 21/01532 701/45 |
| 6,916,040 | B1 * | 7/2005 | Levine | B60N 2/4221 296/68.1 |
| 10,262,474 | B2 * | 4/2019 | Gortsas | G07C 5/0808 |
| 2001/0020777 | A1 | 9/2001 | Johnson | |

(Continued)

FOREIGN PATENT DOCUMENTS

| DE | 19610833 A1 | 3/1996 |
|---|---|---|
| DE | 69809679 T2 | 9/2003 |

(Continued)

*Primary Examiner* — Krishnan Ramesh
(74) *Attorney, Agent, or Firm* — Quinn IP Law (57) ABSTRACT

A method for controlling an inflatable airbag system in a motor vehicle having a seatbelt includes detecting a position of a vehicle occupant relative to an airbag suppression zone (ASZ). Electronic input signals are received from a sensor suite, including an occupant position signal and a seatbelt usage status signal. A restraint capacity setting of the airbag is adjusted in response to the electronic input signals such that corresponding restraint activation logic is executed by the controller based on whether the occupant is belted or unbelted. Different ASZs may be used for belted and unbelted occupants. A motor vehicle includes a vehicle body defining a vehicle interior, an airbag, a seatbelt, a sensor suite for detecting a position of an occupant relative to the ASZ, and a controller operable for controlling a restraint capacity setting and location of the ASZ in accordance with the method.

20 Claims, 4 Drawing Sheets

(56) References Cited

U.S. PATENT DOCUMENTS

| | | |
|---|---|---|
| 2002/0000753 A1 | 1/2002 | Horikoshi |
| 2002/0003345 A1 | 1/2002 | Stanley |
| 2002/0063418 A1* | 5/2002 | Kath ................ B60R 21/01542 280/735 |
| 2002/0158453 A1* | 10/2002 | Levine ............... B60N 2/42736 280/735 |
| 2003/0016845 A1 | 1/2003 | Farmer |
| 2003/0040859 A1 | 2/2003 | Farmer |
| 2003/0163234 A1* | 8/2003 | Olsen ................ G01G 19/4142 701/45 |
| 2003/0197356 A1* | 10/2003 | Fischer ................ B60R 21/239 280/735 |
| 2003/0230879 A1 | 12/2003 | Konda |
| 2007/0273139 A1* | 11/2007 | Kuttenberger ...... B60R 21/0155 280/806 |
| 2008/0157510 A1 | 7/2008 | Breed |
| 2009/0033075 A1* | 2/2009 | Yoshifuku ......... B60R 21/01538 280/730.1 |
| 2009/0058057 A1* | 3/2009 | Ghabra ............. B60R 21/01546 701/49 |
| 2013/0073148 A1* | 3/2013 | Dolan ..................... B60R 22/36 701/45 |
| 2022/0410830 A1 | 12/2022 | Torabi |

FOREIGN PATENT DOCUMENTS

| | | |
|---|---|---|
| DE | 10241993 B3 | 4/2004 |
| DE | 10246055 A1 | 4/2004 |
| DE | 60005977 T2 | 9/2004 |
| DE | 102004057064 A1 | 6/2006 |
| DE | 60308020 T2 | 4/2007 |
| DE | 102005050505 A1 | 4/2007 |
| DE | 102006040244 B3 | 8/2007 |
| DE | 102007044039 A1 | 3/2009 |
| DE | 102013001482 A1 | 3/2014 |
| DE | 102016121882 A1 | 5/2017 |
| WO | WO0144026 A1 | 6/2001 |

* cited by examiner

MOTOR VEHICLE WITH SELECTIVE AIRBAG SUPPRESSION BASED ON OCCUPANT POSITION AND SEATBELT USAGE

INTRODUCTION

A passenger compartment or interior of a motor vehicle includes one or more rows of vehicle seats. In a modern motor vehicle, the seats are surrounded by or attached to one or more passenger restraint systems. Drivers and other vehicle occupants are protected from sudden decelerations and external force/impact events by a seatbelt. As appreciated in the art, a typical lap-and-shoulder seatbelt secures an occupant to a given one of the vehicle seats while distributing energy across the occupant's chest, rib cage, shoulders, and pelvis. A retractor mechanism contains the spool and a spiraling spring, with webbing of the seatbelt rolled onto the spool. Under normal conditions the seatbelt yields to occupant movement, and can also lock up in response to a threshold sudden deceleration to secure the occupant to the vehicle seat.

In addition to seatbelts, a vehicle interior is also typically equipped with one or more inflatable airbag systems and other restraint systems, e.g., seatbelt pretensioners, energy-absorbing devices, adjustable head restraints, knee bolsters, etc. With respect to airbags in particular, inflation of an airbag cushion is triggered when onboard sensors detect a dynamic event resulting in a sudden threshold vehicle deceleration. The sensors transmit signals that ultimately trigger an airbag deployment control circuit. For example, a pyrotechnic process may be initiated that generates an inert gas. The generated gas in turn quickly inflates the airbag cushion. The inflated airbag likewise self-deflates soon after the deployment to complete the airbag deployment process.

SUMMARY

The solutions described in detail below are collectively operable for regulating activation or deployment of one or more inflatable airbag systems ("airbags") aboard a motor vehicle based on an occupant's seatbelt usage state and position. To help control airbag deployment, interior sensors can be outfitted to a vehicle to measure parameters such as an occupant's size, mass, and/or position. Deployment decisions can be made based on these parameters. Relative to occupant position, a sensor or suite of sensors can detect the occupant location within the interior. It is advantageous to detect occupant position dynamically, and thus quickly so that airbag deployment decisions and associated restraint capacity can be modified based on occupant position during an airbag deployment-triggering event. The method described herein detects occupant position as part of the disclosed control strategy.

In particular, the present teachings are directed to performing a controller-based assessment of a vehicle occupant's seatbelt usage status and position within a vehicle interior as input conditions for setting an actual restraint capacity and at least one airbag suppression zone (ASZ) location of the airbag. The airbag is ultimately inflated or the inflation is suppressed or disabled as a result of executing the disclosed seatbelt usage-based logic.

In particular, a method for controlling an airbag, i.e., one or more airbags, aboard a motor vehicle includes detecting a presence and position of an occupant of a vehicle interior relative to one or more defined ASZs of the airbag. The method further includes receiving electronic input signals from an onboard sensor suite. The electronic input signals as contemplated herein include an occupant position signal indicative of the position of the occupant relative to the ASZ(s), and a seatbelt usage status signal indicative of the occupant's present seatbelt usage status. Other signals may be used in addition to the occupant position and seatbelt usage status signals in other possible approaches.

The method in a representative implementation includes automatically adjusting a restraint capacity setting of the airbag(s). This action occurs via operation of the controller in response to the electronic input signals, such that a corresponding set of airbag activation logic is executed by the controller based on whether the occupant is currently belted ("belted occupant") or unbelted ("unbelted occupant"), whether certain body regions of the occupant are within or outside of the ASZ(s), or a combination of both.

One or more embodiments of the present method include measuring a plurality or range of "occupant classes" using the sensor suite. The occupant classes are identified using the electronic input signals, and may be based on factors such as a weight, size, and/or shape of the occupant. The method may additionally include automatically adjusting the restraint capacity setting by establishing an unsuppressed state via the corresponding set of airbag activation logic. This may occur when an occupant class as noted above exceeds a predetermined threshold, or is a predetermined occupant class. In addition, the method may additionally include automatically adjusting the restraint capacity by establishing a suppressed airbag state via the corresponding set of airbag activation logic and modifying restraint capacity for other restraints than the airbag which is suppressed when an occupant class as noted above is below a predetermined threshold, or is a predetermined occupant class.

Automatically adjusting the restraint capacity setting may entail adjusting one or more of a deployment command decision, and when deployment is commanded, an inflator output, timing of the inflator output, an inflated cushion depth, and/or a vent size of the airbag(s). Adjusting the deployment command decision may include adjusting the deployment timing or selectively disabling deployment for an inflator output or a portion thereof. Alternatively or concurrently, automatically adjusting the restraint capacity setting may entail adjusting one or more of a pretensioner output, a seatbelt energy absorption feature, or an energy absorption feature of a moveable vehicle seat. Such an adjustment is based on whether at least a predetermined portion of the occupant's body is present within the ASZ(s).

An aspect of the disclosure may include determining whether a sensor of the sensor suite, i.e., one or more sensors thereof, is defective, disconnected, without power, obscured, or otherwise unable to output reliable signals. The electronic input signals in this instance may include a sensor status signal indicative of the sensor(s) being defective, without power, or obscured, with selective modification or suppression of the airbag occurring in response to the sensor(s) being defective, without power, or obscured. Selectively modifying, suppressing, or reducing the output of the airbag may occur in one or more implementations of the method when the occupant is below a predetermined class threshold, e.g., a predetermined size, shape, weight, etc. Alternatively, these actions may occur for the occupants in the same manner, i.e., regardless of occupant classification.

Optional embodiments of the present method may include detecting a buckled/unbuckled state of a seatbelt buckle, with the seatbelt usage status signal including the buckled/unbuckled state. The seatbelt may be optionally equipped with a buckle switch such that detecting the buckled/unbuckled state of the seatbelt buckle includes determining, via the controller, an associated open/closed switch state of the buckle switch.

In the same or other embodiments, the seatbelt may include a shoulder belt having webbing equipped with an identifiable characteristic. The method in such embodiments may include detecting the identifiable characteristic(s) via a remote sensor of the sensor suite. The seatbelt status signal in turn may include a seatbelt presence detection signal representative or indicative of presence or absence of the seatbelt.

Alternative embodiments of the method include detecting at least one of an impact severity and an object closing speed to the motor vehicle, i.e., a ground speed at which the motor vehicle approaches an object or vice versa. In addition, the size of an oncoming object can also be detected. The method in such an implementation may include temporarily establishing an unsuppressed restraint state in logic of the controller when the impact severity or the object closing speed is above a corresponding threshold value, the oncoming object is above a certain size, or both. The usage of this approach may be limited to occupants who have been detected as unbelted/belted, or it could be applied to both unbelted and belted occupants.

In one or more possible embodiments, receiving the electronic input signals includes receiving an occupant type signal indicative of the occupant being an animal or an object, i.e., a non-human occupant. Automatically adjusting the restraint capacity setting in such embodiments may include modifying or suppressing the inflation or reducing the inflation level of the airbag in the logic of the controller based in part on the occupant type signal.

The above-summarized ASZ in one or more aspects of the disclosure may include a first ASZ and a second ASZ. In such an embodiment, the corresponding set of restraint activation logic may include a first set of logic establishing the first ASZ for the unbelted occupant and a second set of logic establishing the second ASZ for the belted occupant. The location of the ASZ in this embodiment is thus dependent on the occupant's belted/unbelted status. The method may include complete reduction of airbag restraint capacity by suppressing the inflation of the airbag when the unbelted occupant's body or a portion thereof is located within the first ASZ, and enabling inflation of the airbag or modifying airbag restraint capacity when the portion of the unbelted occupant's body is located rearward of the first ASZ. The method may also include complete reduction of airbag restraint capability by suppressing the inflation of the airbag when the belted occupant's body or a portion thereof is located within the second ASZ, and enabling inflation of the airbag or modifying the airbag restraint capacity when the portion of the belted occupant's body is located rearward of the second ASZ.

As another option, a common ASZ, such as the first ASZ, may be used for unbelted occupants and belted occupants, with a first set of logic for the unbelted occupant(s) and a second set of logic for the belted occupant(s). The method may include complete reduction of restraint capacity by suppressing the inflation of the airbag when the unbelted or belted occupant's body or a portion thereof is located within the first ASZ, and enabling inflation of the airbag or modifying airbag restraint capacity when the portion of the unbelted or belted occupant's body is located rearward of the first ASZ.

Possible embodiments of the present method include assessing a position of the belted and unbelted occupants relative to the associated ASZ during a predetermined event, including in this non-limiting embodiment one or more of a vehicle braking event, an object or obstacle avoidance maneuver, an impact event, etc. ("vehicle event"). In another form of predetermined event, the method may also assess the position of the belted or unbelted occupant relative to a non-vehicle event where the occupant chooses to move a portion of their body forward, such as to lean forward to access something on the floor or in the instrument panel's glovebox or chooses to put their feet up on the instrument panel.

A motor vehicle is also disclosed herein. An exemplary embodiment of the motor vehicle includes a vehicle body defining a vehicle interior, with the motor vehicle also having one or more inflatable airbags positioned in the vehicle interior. The motor vehicle additionally includes a sensor suite configured to detect the presence of an occupant of the vehicle interior and a position of an occupant relative to an ASZ of the airbag, as well as a controller operable for controlling a restraint capacity setting thereof. The controller is programmed to receive electronic input signals, including at least an occupant presence signal, an occupant position signal, and an occupant seatbelt usage status signal respectively indicative of the occupant's respective presence, present position, and seatbelt usage (e.g., buckled/unbuckled state, routing, etc.). The controller then executes a corresponding set of restraint activation logic for the airbag based on the position of the occupant relative to the ASZ(s) and whether or not the occupant is a belted occupant or an unbelted occupant.

Another embodiment of the method for controlling an airbag aboard a motor vehicle having a vehicle interior, a sensor suite, and a seatbelt includes detecting a position of an occupant of the vehicle interior relative to an airbag suppression zone (ASZ) of the airbag. This embodiment of the method also includes receiving electronic input signals from the sensor suite, the electronic input signals including an occupant position signal indicative of the position of the occupant and a seatbelt usage signal indicative of a belted/unbelted status of the occupant. The method further includes automatically adjusting a restraint capacity setting of the airbag, via the controller, in response to the electronic input signals such that an airbag deployment decision of the controller is made for a belted occupant based on the location of the occupant relative to the ASZ prior to a vehicle event, and the airbag deployment decision is made for an unbelted occupant during the vehicle event.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments may be arranged in a variety of configurations. Thus, the following detailed description is not intended to limit the scope of the disclosure as claimed, but is merely representative of possible embodiments thereof. In addition, while numerous specific details are set forth in the following description in order to provide a thorough understanding of various representative embodiments, some embodiments are capable of being practiced without some of the disclosed details. Moreover, in order to improve clarity, certain technical material understood in the related art has not been described in detail. Furthermore, the disclosure as illustrated and described herein may be practiced in the absence of an element that is not specifically disclosed herein.

Figure 1:
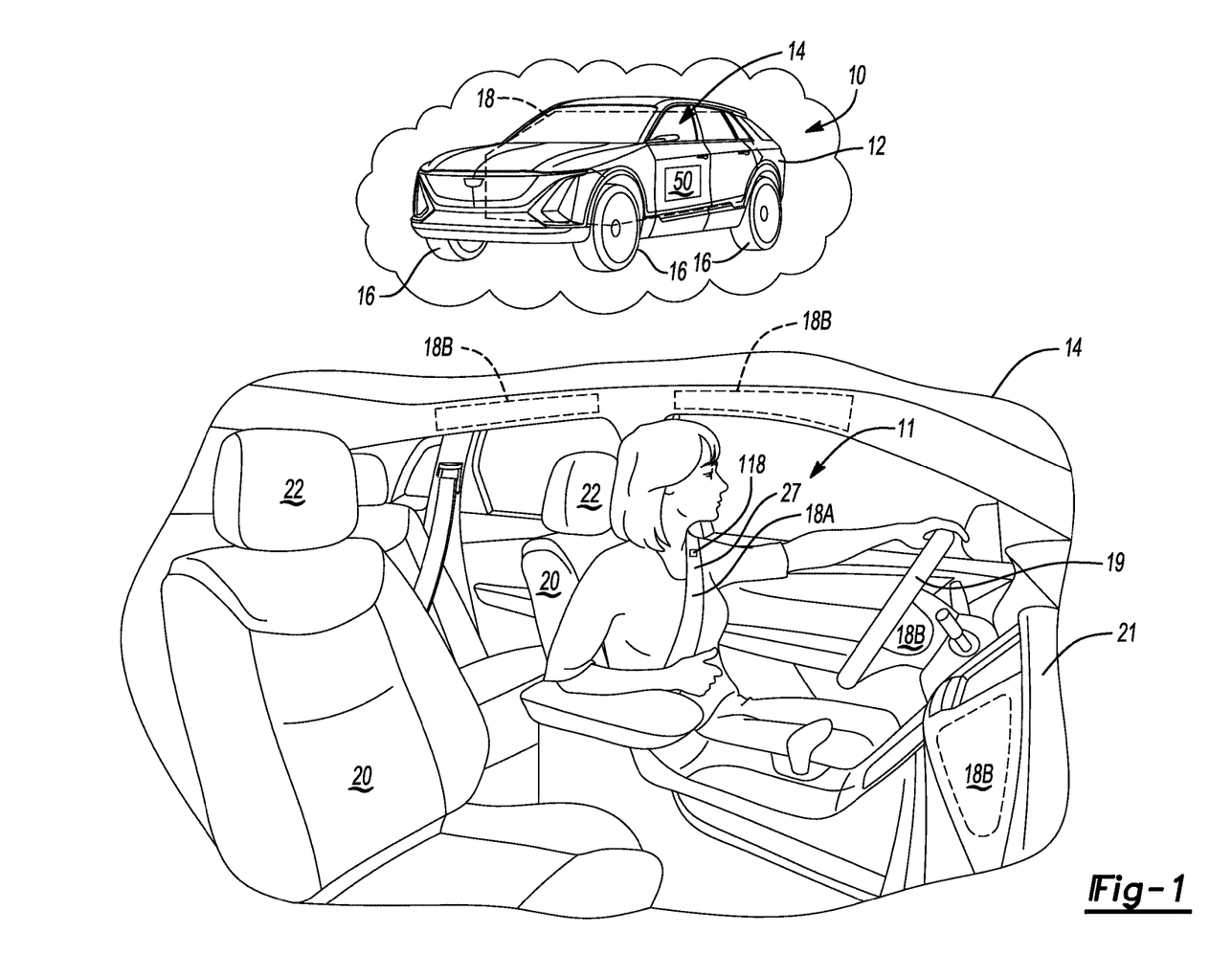
FIG. 1 schematically illustrates a motor vehicle having a vehicle interior with one or more inflatable airbag systems ("airbags") whose restraint capacity settings are adjusted based at least in part on whether an occupant of the motor vehicle is belted or unbelted.

Referring now to the drawings, wherein like reference numbers refer to like features throughout the several views, FIG. 1 depicts a representative mobile system in the form of a motor vehicle 10. The motor vehicle 10 includes a vehicle body 12 defining a vehicle interior 14 and road wheels 16 connected thereto. The motor vehicle 10 additionally includes one or more passenger restraint systems 18 and a controller 50 in communication therewith.

Within the scope of the present disclosure, the controller 50 is configured to execute computer-readable/executable instructions embodying a method 100, a non-limiting example embodiment of which is described below with reference to FIG. 4. By executing the various constituent logic blocks of the method 100, the controller 50 ultimately adjusts an actual restraint capacity setting of the passenger restraint system(s) 18, which has the effect of changing the location or boundary of one or more associated airbag suppression zones (ASZs). Exemplary deployment logic for the passenger restraint system(s) 18 for this purpose is described below. The controller 50 does so based at least in part on a position of an occupant 11 of the vehicle interior 14, along with his or her usage of a corresponding seatbelt 18A.

Figure 2A:
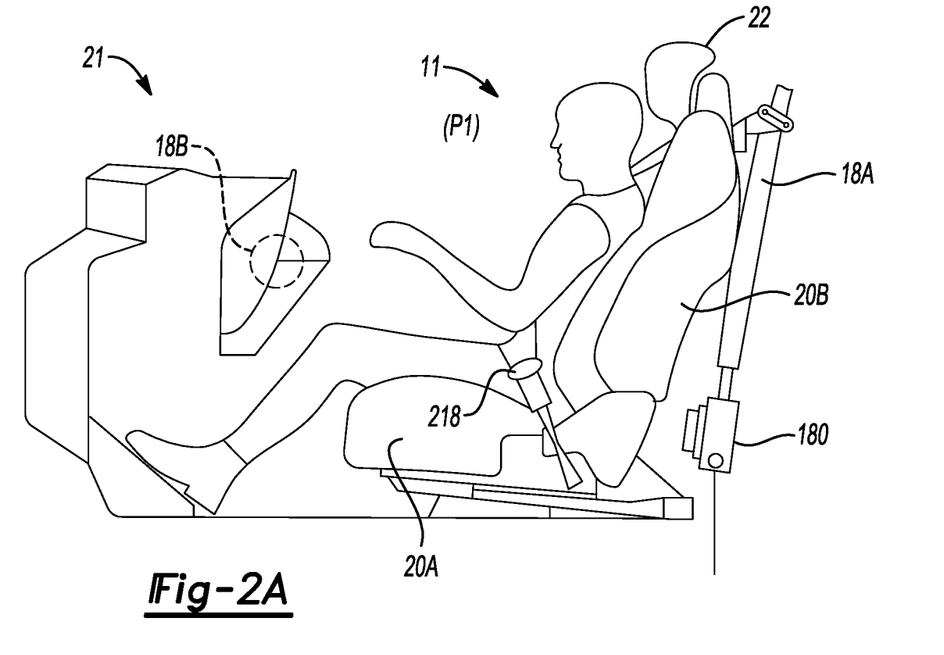
FIG. 2A is a side view illustration of a properly belted occupant of the motor vehicle of FIG. 1 in a normal upright seating position.
Figure 2B:
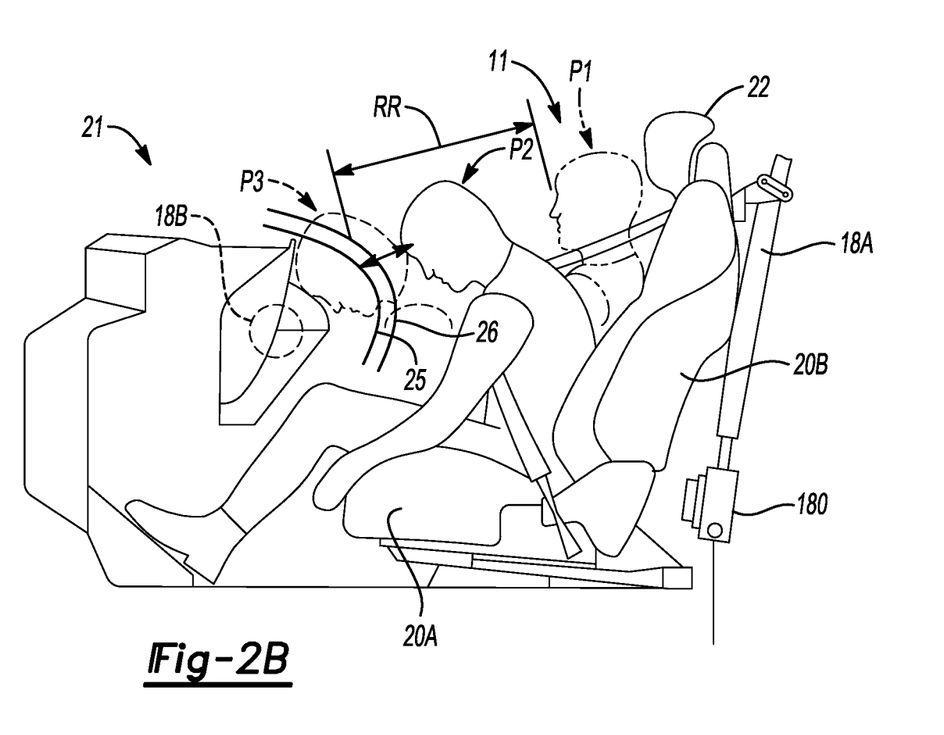
FIG. 2B is a side view illustration of an occupant of FIG. 2A during a representative vehicle event, with FIG. 2B illustrating resulting positions based on the occupant's belted or unbelted status.
Figure 3:
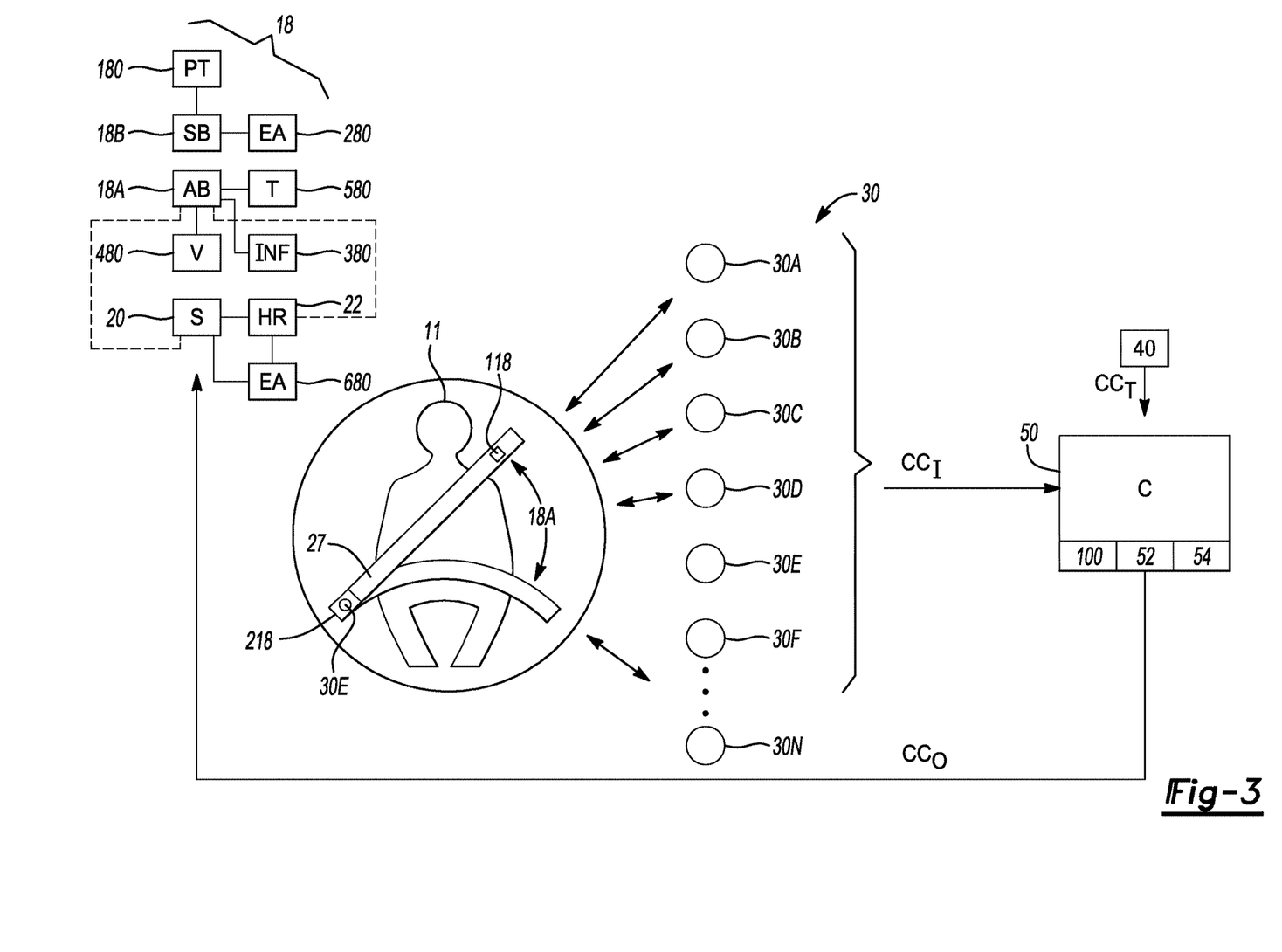
FIG. 3 is a schematic circuit diagram illustrating an exemplary control system for use aboard the motor vehicle shown in FIG. 1 when setting locations of associated airbag suppression zones (ASZs) based on an occupant's belted/unbelted status.

Seatbelt usage status of the occupant 11 as contemplated herein may be verified by the controller 50 in several ways, including but not limited to detection of a latched/unlatched state of a seatbelt buckle 218 or an on/off state of a buckle switch 30E, with the seatbelt buckle 218 shown in FIGS. 2A, 2B, and 3, and the buckle switch 30E shown in FIG. 3. Seatbelt usage may also be determined by the controller 50 by evaluating seatbelt routing, e.g., via detection of an identifiable characteristic 118 of the seatbelt 18A or attached thereto.

The identifiable characteristic 118 in one or more embodiments may include a color and/or sheen of seat belt webbing 27 of the seatbelts 18A, specific identifiable patterns on the webbing 27 such as stripes, checks, and other discrete markings. The identifiable characteristics 118 may include an embedded detectable element such as a magnet, a piece of metal, or another item that is detectable by the remote sensor 30B. Materials that reflect or block certain light wavelengths may be added as a coating on the webbing or on/within the threads within the webbing 27, for instance infrared (IR)-absorbing and reflecting materials. When an identifiable characteristic 118 is used to detect a presence of the seatbelt 18A, the seatbelt 18A may be deemed to be present/used when the shoulder belt present on the occupant's torso is detected, and not present/not used when the shoulder belt is not detected on the occupant's torso. Detection of the lap belt may not be part of the seatbelt usage determination logic, since the lap belt could be out of the field of view or obscured by the occupant's body or objects on the occupant's lap. However, the present method in other implementations may include lap belt detection.

A seatbelt presence detection signal may also be generated by the remote sensor 30B indicative of a usage status of the seatbelt 18A. The seatbelt usage status (belted/unbelted) and the presence and position of the occupant 11 relative to a defined limit or edge of the ASZ, possibly in conjunction with one or more other conditions as described below, are thereafter used by the controller 50 to selectively adjust the location of one or more ASZs as set forth below.

The representative vehicle interior 14 depicted in FIG. 1 includes moveable or adjustable vehicle seats 20 on which the occupant 11 may be seated as shown. Solely for illustrative clarity and simplicity, a single occupant 11 is shown as a driver of the motor vehicle 10. However, the present teachings are extended to additional occupants 11 possibly seated elsewhere within the vehicle interior 14, including rear or front seat passengers. For example, FIGS. 2A and 2B show a front passenger seating position. Each vehicle seat 20 may include an adjustable head restraint 22, with the head restraints 22 possibly having an adjustable position, angle, or other restraint capacity setting enabling the head restraints 22 to function as part of the passenger restraint system(s) 18. The head restraint(s) 22 in some constructions are manually moveable, motorized, or able to move when a deployment is commanded, for instance via a released spring or pyrotechnic device.

The passenger restraint system(s) 18 of the present disclosure also include one or more inflatable airbag systems ("airbags") 18B. The seatbelts 18A may be equipped with adjustable devices such as, e.g., a motorized pretensioner 180 and an energy-absorbing device 280 and/or 680 as shown schematically in FIG. 3, and an inflator device 380 and one or more airbag vents 480 possibly being used in conjunction with the various airbags 18B.

As appreciated in the art, pyrotechnically-deployable, inflatable airbag systems such as the representative airbags 18B shown in FIG. 1 come in a variety of forms, with a given vehicle interior 14 being equipped with one or more of the airbags 18B depending on the configuration of the vehicle interior 14. For example, one or more of the airbags 18B may be situated in or near an instrument panel 21, typically packaged within a steering wheel 19 and a panel adjacent thereto or along/below the instrument panel 21, along sides of the vehicle interior 14, in the roof of the motor vehicle 10 of FIG. 1, in several locations within a vehicle seat 20 such as under a seat bottom cushion on the inboard side of the seat back, on the outboard side of the seat back, in the back of the seat back, and in the head restraint 22, and possibly within the webbing 27 of the seatbelts 18A. Thus, the vehicle interior 14 could be equipped with frontal airbags, curtain airbags, knee airbags, seatbelt airbags, overhead airbags, under-thigh airbags, side impact airbags, and/or other airbags within the scope of the disclosure. Such airbags 18B are rapidly inflated, e.g., within about 50 milliseconds, with inflation typically occurring in response to a chemical charge to allow the airbag 18B to quickly expand and deploy.

Referring briefly to FIG. 2A, the controller 50 of FIG. 1 is operable for assessing a position of the occupant 11 within the vehicle interior 14, along with determining a belted/unbelted status of the occupant 11. Position P1 corresponds to the normal upright seating position of the occupant 11 in a non-limiting example scenario in which the occupant 11 is facing the instrument panel 21. Other embodiments may be envisioned in which the occupant 11 could be expected to move in a different direction, and possibly toward a differently situated airbag 18B. The occupant 11 is seated on a seat cushion 20A and resting against a back cushion 20B of the vehicle seat 20 shown in FIG. 1, adjacent to the head restraint 22. As a belted occupant, the occupant 11 is wearing the seatbelt 18A, with the pretensioner 180 also shown in FIG. 2A.

A predetermined event can consist of a vehicle event or a non-vehicle event. As illustrated in FIG. 2B, during a vehicle event, e.g., a hard braking event, an aggressive obstacle/object avoidance maneuver, an impact event, etc., the occupant 11, when properly wearing the seatbelt 18A as a belted occupant, may be expected to reach a position similar to position P2, which in turn is closer to the airbag 18B than position P1. This position can also be reached during a non-vehicle event where the occupant 11 chooses to move a portion of their body forward, such as to lean forward to access something on the floor or in a glovebox of the instrument panel 21 of FIG. 1. In contrast, the occupant 11 if unbelted may reach a position similar to position P3 during a vehicle event or a non-vehicle event. Relative to positions P1 and P2, position P3 is proximate the airbag 18B in this exemplary deployment scenario. Also shown in FIG. 2B is a representative first airbag suppression zone (ASZ) having a first ASZ edge 25, with the first ASZ edge 25 representing the edge defining a space between the airbag 18B and the occupant 11, within which the occupant 11 may experience excessive loading by a deploying airbag 18B if the occupant 11 were to be located in this space during such a deployment of the airbag 18B.

In addition, a representative second airbag suppression zone (ASZ) is shown in FIG. 2B having a second ASZ edge 26, with the second ASZ edge 26 representing the edge defining a space between the airbag 18B and this second ASZ edge 26. The second ASZ is a modified location that may be slightly closer to, or farther from, the occupant 11 than the first ASZ noted above. This second ASZ in some configurations may be used for occupants 11 using the seatbelt 18A, so as to completely reduce the restraint capacity of the airbag by suppressing the airbag 18B if the occupant 11 intrudes into the space forward of the second ASZ edge 26. An optional approach is to look at the position of the occupant 11 prior to a vehicle event and determine if the airbag 18B is to be suppressed based on the occupant's position prior to the vehicle event, as the occupant 11 can be in many possible locations prior to the vehicle event. This would eliminate the need to perform a dynamic occupant position assessment during the vehicle event, and necessitates that the second ASZ be located further away from the airbag 18B than the first ASZ so that the amount of motion from a belted occupant 11 during a vehicle event (a small amount of motion before the seatbelt restrains the occupant and the occupant's head bobs forward) would not cause the occupant 11 to intrude into the first ASZ.

As another option, the first ASZ could be used for both unbelted and belted occupants if it was determined that the distance between the first and second ASZs is negligible (eliminating the need for a second ASZ), or using a simpler, less complex approach.

As depicted in FIG. 2B, after the occupant 11 reaches a position near position P2, the trajectories of the belted and unbelted occupants 11 significantly deviate. The present approach may include detecting at least one of an impact severity and an object closing speed relative to the motor vehicle 10 of FIG. 1, and then temporarily establishing an unsuppressed restraint state of the airbag(s) 18B or a higher restraint state of the airbag(s) 18B in the logic of the controller 50 when the impact severity or the object closing speed is above a corresponding threshold value. The usage of this approach may be limited to occupants who have been detected as unbelted, or belted or it could be applied to both unbelted and belted occupants.

The controller 50 of FIG. 1 is thus configured to detect the position of the occupant 11 relative to the first ASZ, i.e., the first ASZ edge 25, and the second ASZ with its second ASZ edge 26, and to automatically adjust a restraint capacity of the airbag 18B based at least in part on the belted/unbelted status of the occupant 11. Since belted and unbelted occupants could have a similar trajectory up to the point in time and occupant forward movement when the seatbelt 18A stops the belted occupant's motion, e.g., reflected as the representative position P2 of FIG. 2B, it would be advantageous to implement an approach that knows whether the occupant 11 is belted or unbelted. The capability of knowing if an occupant 11 is belted or unbelted enables the controller 50 and the associated method 100 to track both belted and unbelted occupants 11 over their complete movement distance, such as the exemplary distance RR depicted in FIG. 2B. Without knowledge of the belted/unbelted status of the occupant 11, the time and travel space difference between the belted and unbelted occupants 11 is much less, such as that represented by the distance between occupant positions P2 and P3 in FIG. 2B. Thus, a failure to consider the belted/unbelted status of the occupants 11 would restrict the timeframe and travel space usable to determine future occupant trajectory differences between belted and unbelted occupants 11.

Referring now to FIG. 3, each of the airbags 18B used within the vehicle interior 14 of FIG. 1 may include the above-noted inflator ("INF") 380, the airbag vents ("V") 480, the airbag tethers ("T") 580, or combinations thereof in these different configurations. The inflator(s) 380, as understood in the art, may in some embodiments include an elongated body or a more "squat body, e.g., containing one or more selectively activated gas propellant charges. In multi-stage embodiments of the airbag 18B in particular, two or more such inflators 380 are typically connected to a single airbag 18B, with each inflator 380 in turn having a corresponding inflation capacity. The inflators 380 are typically within the same inflator body and may share components. The inflators 380 in some embodiments may be staged so as to deploy at different times or within an adjustable interval of each other, or one of the inflators 380 may activate and not the other. The airbag vents 480 for their part may open to a greater degree to provide a softer airbag 18B, or to a lesser degree may be mechanically closed or reduced in size to provide a harder airbag 18B, as will likewise be appreciated by those of ordinary skill in the art. The vents 480 may be embodied as discrete vents or the size of the vents 480 may be controlled by the airbag tethers 580 in the airbag 18B, or by a pyrotechnic device (not shown). The airbag tethers 580, which control the shape of the airbag 18B, may be fixed length tethers or tethers that extend or release when a device such as a pyrotechnic device is deployed. With deployment, restraint capacity is thus controllable by adjusting the inflator output, the vent output, and/or the tether length. Additionally, a restraint capacity setting of one or more seat or seat-based devices may also be controlled as part of the present strategy, including moveable portions of the vehicle seats 20 and the head restraints (HR) 22, along with the pretensioners 180, the energy-absorbing devices 280 and 680, etc., as shown schematically in FIG. 3.

In a possible approach, the controller 50 of FIG. 3 may assess the occupant(s) 11 based on defined criteria referred to herein as "occupant classes". When the occupant 11 enters the vehicle interior 14, and also during a ride event, the controller 50 could examine the occupant 11 for certain identifiable attributes, e.g., weight, size, shape, etc., and then compare the attributes to calibrated values. In this manner, the controller 50 could measure a range of occupant classes using the sensor suite 30 and automatically adjust restraint capacity settings of the airbag(s) 18B. This may entail establishing an unsuppressed state or a higher restraint capacity condition regardless of occupant position when the occupant class of the measured range is above a predetermined threshold or when the occupant 11 is verified as being within or matching a predetermined occupant class. Likewise, this may entail establishing a completely reduced restraint capacity via a suppressed state or a reduced constraint capacity state regardless of occupant position when the occupant class of a measured range is below a predetermined threshold or when the occupant 11 is verified as being within or matching a predetermined occupant class.

As appreciated in the art, one or more sensors 40 of a typical sensing and airbag deployment system are configured to monitor or measure a host of variables, including but not necessarily limited to external impacts, wheel speeds, lateral and longitudinal accelerations, seat occupant presence status, seat occupant position, brake pressure, steering angle, pitch, yaw, roll, etc. The sensors 40 relay electronic input signals to the controller 50 as a triggering signal (arrow $CC_T$). The controller 50 analyzes the triggering signal (arrow $CC_T$) and thereafter orchestrates onboard functions of the passenger restraint system 18, e.g., by locking the seatbelts 18A, inflating one or more of the airbags 18B, controlling the venting of one or more of the airbags 18B, controlling the length of the tether(s) 580 of one or more of the airbags 18B, controlling latching/unlatching states of door locks (not shown), positioning the head restraints 22 or seats 20, etc. The controller 50 is therefore made aware of sensor readings from the sensors 40 while the motor vehicle 10 of FIG. 1 is in operation.

With respect to the sensor suite 30 shown schematically in FIG. 3, representative sensor devices may include, without limitation, at least one in-seat sensor 30A such as a pressure-detecting bladder, a resistance-detecting surface that changes state when the surface is compressed, a load cell system, and/or a capacitive sensor. These sensors are typically in or near the bottom seating surface of the vehicle seat 20. As used herein, "in-seat" refers to integration with a corresponding one of the vehicle seats 20 of FIG. 1, for instance embedded within the vehicle seats 20 and/or connected thereto.

The onboard sensor suite 30 may also include one or more remote sensors 30B, i.e., "remote" with respect to the occupants(s) 11 and the vehicle seats 20. Such remote sensors 30B may be situated somewhere within the vehicle interior 14 of FIG. 1, such as by being attached to a rearview mirror (not shown), mounted to the inside vehicle roof structure (not shown), mounted to a pillar structure (not shown), or mounted to the instrument panel 21. In various possible embodiments, the remote sensors 30B could include radar, lidar, and/or ultrasound sensors, a camera, e.g., visible spectrum or red-green-blue (RGB), RGB plus infrared (RGB+IR), IR, time of flight (TOF), structured light, thermal, stereo vision, etc.

Other possible sensors of the representative sensor suite 30 of FIG. 3 include biometric sensors 30C, which could be mounted to the vehicle interior 14 and/or worn by the occupant 11. Exemplary biometric data that could be measured and reported by the biometric sensors ("biosensors") 30C include a heartbeat or respiration rate of the occupant 11 or micromotions thereof, a voice, body temperature, brain waves, fingerprints, alcohol level, the presence of implanted medical devices such as pacemakers, other metal content inside the body, heat, muscle activation, etc. Such measurements may be used in one or more embodiments to further control an associated ASZ(s) of the airbag(s) 18B or the restraint capacity of the airbag(s) 18B.

The collective set of information provide to the controller 50 by the onboard sensor suite 30 also includes occupant position data from one or more occupant position sensors 30D, e.g., another camera, remote sensor, or proximity detector operable for determining a position of the occupant 11 within the vehicle interior 14 of FIG. 1. As noted below, such data could be combined with data from the various other sensors 30A, 30B, 30C, 30D, and possibly other sensors as represented by 30N, in order to "fine tune" the predictive accuracy of the controller 50 when controlling the occupant restraint system(s) 18. Within the scope of the disclosure, the other sensors 30N may include the buckle switch 30E of FIG. 3, and a seatbelt routing sensor 30F which detects the presence of the identifiable characteristic 118 of the seatbelt 18A in front of the occupant's torso as described above. Other sensors not mentioned herein are possible in other configurations. Note that some of the sensors 30A, . . . , 30N may detect more than one of the desired detection functions described herein.

In accordance with the present disclosure, the controller 50 executes computer-readable instructions embodying the method 100 in response to electronic input signals (arrow $CC_I$) to perform the various functions described herein. The term "controller" and related terms such as microcontroller, electronic control unit, etc., refer to one or various combinations of Application Specific Integrated Circuit(s) (ASIC), Field-Programmable Gate Array (FPGA), electronic circuit(s), central processing unit(s), e.g., microprocessor(s) and associated transitory and non-transitory memory/storage component(s).

The controller 50 of FIGS. 1 and 3 is depicted schematically as having a processor 52 of one or more of such types, as well as memory 54 inclusive of non-transitory memory or tangible storage devices (read only, programmable read only, solid-state, random access, optical, magnetic, etc.). The memory 54, on which computer-readable instructions embodying the method 100 may be recorded, is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Ultimately, the controller 50 outputs a control signal (arrow $CC_O$) to one or more of the passenger restraint systems 18 described herein to regulate an actual capacity setting thereof. An exemplary approach will now be described with reference to FIG. 4.

Figure 4:
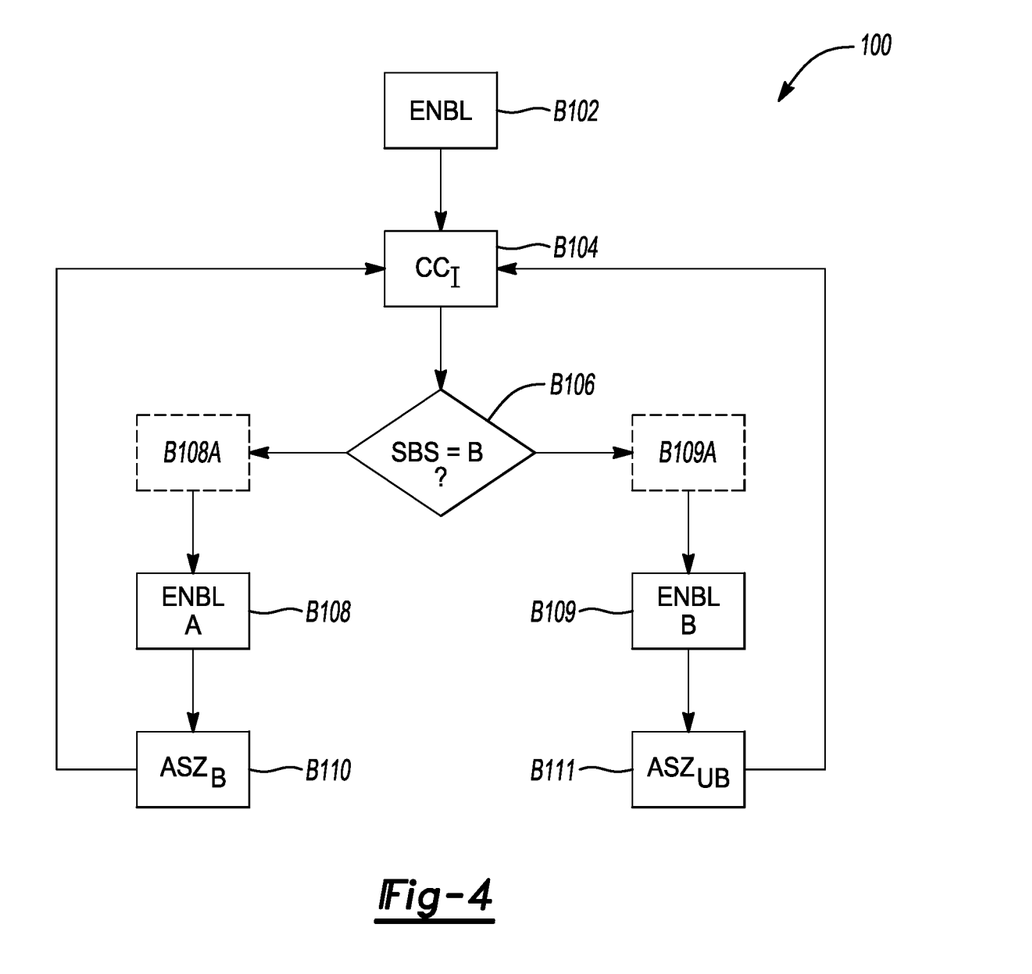
FIG. 4 is a flow chart illustrating a representative embodiment of a method for dynamically adjusting restraint capacities of an airbag of a type shown in FIGS. 1 and 3.

Referring now to FIG. 4, the method 100 in accordance with the present disclosure is executed by the processor 52 of FIG. 3 from non-transitory elements of the memory 54 to situationally adjust actual capacity settings of one or more of the various passenger restraint systems 18 as described above. The method 100 may be performed in a range of manners to provide a desired level of control across a possible continuum of actual capacity settings of the passenger restraint system(s) 18, and thus the method 100 as described below is just one possible implementation of the present teachings.

The method 100 commences with block B102 after initialization of the controller 50, e.g., a key-on event of the motor vehicle 10 shown in FIG. 1. As used herein, the term "block" refers to programmed logic, computer-readable code, algorithm(s), or subroutine(s) used by the controller 50 to implement the corresponding functions.

At block B102, the controller 50 enables performance of the method 100 ("ENBL"). Exemplary conditions for performing the method 100 may include a dynamic state of the motor vehicle 10, i.e., the motor vehicle 10 being in a drive mode and/or presently in motion. Other enablement conditions may be used in different embodiments, including possibly using a detected weight of the occupant 11, visual, infrared, thermal, radar, or lidar, signatures, machine vision, and/or other available sensory data indicative of the presence of one or more occupants 11 within the vehicle interior 14 shown in FIG. 1. Such sensory data may be provided by one or more of the sensors 30A-30C of FIG. 3. Additionally, block B102 or other parts of the method 100 may be initiated for certain occupant classes or orientations, as determined from the data from the sensors 30A-30C. The method 100 then proceeds to block B104.

At block B104 ("REC $CC_I$") of the method 100, the controller 50 of FIGS. 1 and 3 receives the electronic input signals (arrow $CC_I$ of FIG. 3) from the sensor suite 30. Such electronic input signals include an occupant position signal from the position sensor 30D of FIG. 3, with such a signal being indicative of the present position or location of the occupant 11 in the vehicle interior 14, and a seatbelt status signal from the sensors 30B, 30E, and 30F (if present) of FIG. 3 indicative of a belted/unbelted status of the occupant 11. The method 100 proceeds to block B106 once the controller 50 has received the electronic input signals (arrow $CC_I$) of FIG. 3.

Block B106 ("SBS=B?") includes determining, again via the controller 50, whether the occupant 11 is a belted occupant or an unbelted occupant. That is, the controller 50 evaluates the seatbelt status signal from block B104 and determines whether the occupant 11 is wearing the seatbelt 18A of FIG. 1-3 in the correct manner, i.e., the seatbelt 18A is buckled and properly routed relative to the torso and if detectable, the hips of the occupant 11. The method 100 may proceed to optional block B108A when the seatbelt status signal indicates that the occupant 11 is a belted occupant, with the method 100 proceeding in the alternative to optional block B109A. Block B106 may proceed directly to blocks B108 or B109 when optional blocks B108A and B109A are not used.

Blocks B108A and B109A may be implemented to look to additional evaluation criteria so as to further refine the capacity adjustments and ASZ locations set forth below. For example, the controller 50 may, in addition to position and seatbelt usage of the occupant 11, look to the above-described optional occupant classes, e.g., a weight, size, and/or shape of the occupant 11, when determining whether and how to adjust the inflation capacity of one or more of the airbags 18B.

To that end, an unsuppressed restraint state of the airbag(s) 18B or a higher restraint state of the airbag(s) 18B may be established in the logic of the controller 50 when the occupant class of the measured range is above a predetermined threshold or when the occupant 11 is verified as being within or matching a predetermined occupant class. Likewise, a reduced restraint state of the airbag(s) 18B including a suppressed state of the airbag(s) 18B can be established in the logic of the controller 50 when the occupant class of a measured range is below a predetermined threshold or when occupant 11 is verified as being within or matching a predetermined occupant class. Both of these outcomes may result without consideration of occupant position.

As another example, the controller 50 may also look at the impact severity, object closing speed relative to the motor vehicle 10 of FIG. 1, or both when determining whether and how to adjust the inflation capacity of one or more of the airbags 18B. An unsuppressed restraint state of the airbag(s) 18B or a higher restraint state of the airbag(s) 18B may be established in the logic of the controller 50 when the impact severity or the object closing speed is above a corresponding threshold value. This could be done for all of the occupant classes or selected occupant classes, e.g., for larger occupants 11. This outcome may also result without consideration of occupant position. In addition, this could be done for only unbelted occupants, only belted occupants or both.

Note that in the event data being fed into block B106 from block B104, or at the point of receipt of such data in block B104, or later at blocks B108A and B108B described below indicates an obscured, disconnected, without power, or malfunctioning sensor, e.g., by deviations from expected signals, absences of such signals, or low signal quality, the method defaults to a completely reduced restraint capacity suppressed state, which can either be applied to a) all occupants or b) may in one or more embodiments be restricted to smaller occupant classes, along with an associated enabled state for larger occupant classes to mimic the deployment approach for systems that base airbag deployment on occupant weight. In other embodiments, the controller 50 of FIGS. 1 and 3 may designate more than one airbag suppression zone (ASZ) location, e.g., as the above-described first ASZ with the first ASZ edge 25 and the second ASZ with the second ASZ edge 26, in a simplified embodiment (see FIG. 2B). The controller 50 may thereafter enable inflation or deployment of the airbag(s) 18B when the occupant 11 is belted and a predetermined portion of the occupant's body is located rearward of the second ASZ, while suppressing the airbag(s) 18B if a predetermined portion of the same occupant's body is inside of the second ASZ. In an alternative approach, when the second ASZ is not used, the controller 50 may enable inflation or deployment of the airbag(s) 18B when the occupant 11 is belted and a predetermined portion of the occupant's body is located rearward of the first ASZ while suppressing the airbag(s) 18B if a predetermined portion of the occupant's body is located inside of the first ASZ.

Alternatively, the controller 50 could decide to suppress one or more of the airbags 18B to at least some extent when the occupant 11 is unbelted and a predetermined portion of the occupant's body is located inside of the first ASZ, and could enable the airbag(s) 18B when the predetermined portion of the occupant's body is located rearward of the first ASZ. In addition to using seat belt usage, biometric data as described above could be used in one or more embodiments to adjust the inflation capacity and ASZ locations. The predetermined portion of the occupant's body used to compare to the ASZ locations for intrusion into the ASZ(s) are likely the head, neck, and torso. Legs and possibly hands and arms may be used in other embodiments. Likewise, hands and arms and possibly legs may be excluded from the occupant position determination in still other implementations. The method 100 then proceeds to blocks B108 and B109.

Block B108 of the representative embodiment of the method 100 shown in FIG. 4 may include enabling a first set of logic of the controller 50 in response to the occupant 11 being a belted occupant, as previously determined in block B106. When optional block B108A is used, execution of block B108 will help account for the additional criteria described above. In a possible implementation, the controller 50 may activate in its memory 54 a set of corresponding logic requiring inflation or deployment of the airbag(s) 18B for the belted occupant 11, or suppression of the airbag(s) 18B. The particular selection could be made based on the detected position of the occupant 11 relative to the corresponding ASZ being used, which for a belted occupant could either be the second ASZ or, if the second ASZ is not used, the first ASZ. That is, a deployment may be enabled for the occupant 11 when the occupant 11 is belted and a predetermined portion of the occupant's body is located rearward of the corresponding second or first ASZ(s), with suppression of the airbag(s) 18B when a predetermined portion of the body of the same occupant 11 is located within the corresponding ASZ(s). Depending on the information provided from optional block B108A, the controller 50 could also enable a modified output for other restraints 18, such as by adjusting a setting of the seatbelt pretensioner 180, the energy-absorbing device 280, adjusting the setting or energy absorption of the vehicle seats 20 and/or the head restraints 22, etc., of FIG. 3 to a different restraint capacity setting either alone or in conjunction with deployment or suppression of the airbag(s) 18B.

Control actions taken by the controller 50 in block B108 may include modifying restraint capability by adjusting one or more of a restraint system deployment command decision, e.g., a decision to deploy or not deploy as well as when deployment is commanded: the timing, sequencing, and extent of such a deployment, along with the magnitude of the inflator output, timing of the inflator output, the time delay between stages of the inflator output, an airbag inflated cushion depth, and/or a vent size of the airbag 18B. Other control responses could be enacted for other restraint systems 18, including possibly adjusting a setting or an output of the pretensioner 180 and/or seatbelt energy-absorbing device 280 of FIG. 3, or a moveable seat energy absorption feature. Any of these features that partially reduce restraint capacity can be considered a modified deployment compared to the highest output state which can be considered a full deployment.

When deployment is called for, in particular in an optional two-stage embodiment of the airbags 18B, the controller 50 could activate logic for the entire inflation force or a lower total inflation force, e.g., about 70% of a total possible inflation force. The method 100 then proceeds to block B110.

At block B109, the controller 50 enables a second set of logic in response to the occupant 11 being unbelted. When optional block B109A is used, block B109 accounts for the additional criteria described above for block B109A. In a possible implementation, the controller 50 may activate in memory 54 a corresponding set of logic requiring suppression of the airbag(s) 18B. As with block B108, this particular selection could be made based on the detected position of the occupant 11 relative to the ASZ(s), which is the first ASZ in the case of an unbelted occupant. That is, a deployment may be enabled for an unbelted occupant 11 when a predetermined portion of the occupant's body is located rearward of the corresponding first ASZ, and suppression may be selectively enabled for an unbelted occupant 11 when a predetermined portion of the occupant 11 is located in the first ASZ. Suppression of the airbag(s) 18B may be accompanied in some embodiments along with an adjustment of a setting of the seatbelt pretensioner 180, the energy-absorbing device 280 connected to the seatbelt 18A, the vehicle seats(s) 20, and/or the head restraint(s) 22.

Control actions taken by the controller 50 in block B109, as with block B108, may include modifying restraint capability by adjusting one or more of a restraint system deployment command decision, and when deployment is commanded: the timing, sequencing, and extent of such a deployment, along with the magnitude of the inflator output, timing of the inflator output, the time delay between stages of the inflator output, an airbag inflated cushion depth, and/or vent size of the airbag 18B. Other control responses could be enacted for other restraint systems 18, including possibly adjusting a setting or energy absorption of the vehicle seat(s) 20 (FIG. 1), and/or the head restraint(s) 22 as shown in FIG. 3. Any of these features that partially reduce restraint capacity may be considered herein to be a "modified deployment" compared to a highest output state considered to be a "full deployment".

When deployment is called for, in particular for an optional two-stage embodiment of the airbags 18B, the controller 50 could activate logic for the entire inflation force or a lower total inflation force, e.g., about 70% of a total possible inflation force. The method 100 then proceeds to block B111.

Block B110 ("$ASZ_B$") may entail, in response to a vehicle event or force event requiring a deployment of the airbag(s) 18B, automatically inflating one or more of the airbag(s) 18B in accordance with the location specified in logic at block B108. Absent a triggering event, an undeployed/uninflated airbag 18B is enabled with the logic of block B108. Upon activation, each affected airbag 18B is inflated when a predetermined portion of the belted occupant 11 is situated outside of the ASZ(s), with suppression of the airbag(s) 18B occurring, when a predetermined portion of the belted occupant 11 is situated within the ASZ(s). The method 100 then returns to block B104.

At block B111 ("$ASZ_{UB}$"), which is analogous to block B110, upon occurrence of a triggering event, an inflation of the airbag(s) 18B occurs when the occupant 11 is unbelted and a predetermined portion of the occupant 11 is situated outside of the ASZ(s). Suppression occurs when a predetermined portion of the body of the unbelted occupant 1 is present within one or more of the ASZ(s). The method 100 then returns to block B104.

As will be appreciated by those skilled in the art, the above teachings enable occupant-specific levels of control to be applied to inflation of one or more airbags 18B shown in FIG. 1. Unlike systems that selectively disable certain restraint devices such as front airbags based on static weight thresholds, the present approach instead provides a level of dynamic refinement by assessing position and seatbelt usage of occupants 11 of the motor vehicle 10, and by thereafter controlling restraint capacities along a permissible continuum. While such capacity adjustments are primarily directed herein to inflation of the airbag(s) 18B and adjustment of locations of one or more ASZs, the method 100 may be fine-tuned to include adjustment of one or more other restraint systems 18 as noted above.

Other refinements may be included within the scope of the disclosure, including but not limited to consideration of "occupant type", i.e., whether the occupant 11 is non-human. Animals and objects, e.g., cargo, packages, luggage, etc., are examples of non-human occupants 11 within the scope of the disclosure. The controller 50 may be calibrated in one or more configurations to assess occupant type and respond accordingly when adjusting restraint capacities. In one or more embodiments, the controller 50 of FIGS. 1 and 3 may suppress the airbag(s) 18B when an animal or object is detected without the presence of a human. The change in location of one or more ASZs in accordance with the present teachings therefore tailors deployment of the airbags 18B to account for position of the occupants 11, their individual positions and usage of a given one of the seatbelts 18A, and other possible refinements, e.g., size, weight, shape, biometric vulnerability, occupant type, or another classification or criteria as set forth above.

Additionally, the above-described strategy may be expanded to include transmitting, broadcasting, or otherwise providing an "ASZ intrusion" alert message or a series of alert messages to one or more predetermined message recipients, e.g., the occupant(s) 11, a ride share home office, a software application ("app"), etc. Such messages could be used to alert recipients of the message(s) that the occupant 11 is detected within the ASZ(s). For the occupant 11 when inside of the vehicle interior 14, the alert may be audible, visible, and/or haptic alert message, and may be primarily initiated in quasi-static conditions, such as when the occupant 11 leans forward to access something or places their feet on the instrument panel 21. In one or more embodiments, the position of the occupant 11 could be recorded in memory of the controller 50, or in an "outside-the-vehicle" app so that the position/ASZ intrusion data is retrievable after a vehicle event resulting in deployment of the airbag(s) 18B, e.g., by emergency personnel, first responders, investigators, or other interested parties. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling an airbag aboard a motor vehicle having a vehicle interior, a sensor suite, and a seatbelt, the method comprising:
    recording a first set of inflation logic in memory of a controller, the first set of inflation logic corresponding to an unbelted status of an occupant of the vehicle interior;
    recording a second set of inflation logic in the memory of the controller, the second set of inflation logic corresponding to a belted status of the occupant of the vehicle interior;
    detecting a position of the occupant of the vehicle interior relative to a first edge of a first airbag suppression zone (ASZ) of the airbag;
    detecting a position of the occupant of the vehicle interior relative to a second edge of a second ASZ of the airbag;
    receiving electronic input signals from the sensor suite, the electronic input signals including an occupant position signal indicative of the position of the occupant relative to the first edge and the second edge, and a seatbelt usage status signal indicative of the belted status or the unbelted status of the occupant; and
    automatically adjusting a restraint capacity setting of the airbag via the controller, in the first set of restraint activation logic of the controller or the second set of restraint activation logic of the controller, in response to the electronic input signals based on the position of the occupant (i) relative to the first edge when the occupant has the unbelted status, and (ii) relative to the second edge when the occupant has the belted status, such that a location of the first ASZ or the second ASZ is modified based on the belted status or the unbelted status, and the restraint capacity setting of the airbag is modified based on the position of the occupant relative to the first edge and the second edge.

2. The method of claim 1, further comprising:
    measuring a range of occupant classes using the sensor suite, the range of occupant classes being based on at least one of a weight, a size, and a shape of the occupant, wherein the electronic input signals include the range of occupant classes; and
    automatically adjusting the restraint capacity setting by establishing an unsuppressed state of the airbag via a corresponding set of the restraint activation logic when an occupant class within the range of occupant classes is above a predetermined threshold or within a predetermined occupant class.

3. The method of claim 1, wherein the vehicle interior includes a moveable or adjustable seat, and wherein automatically adjusting the capacity setting includes adjusting one or more of a restraint deployment command decision, an inflator output of the airbag, timing of the inflator output, an inflated cushion depth of the airbag, a vent size of the airbag, a pretensioner output of the seatbelt, an energy absorption feature of the seatbelt, and an energy absorption feature of the seat.

4. The method of claim 1, further comprising:
    determining whether a sensor of the sensor suite is defective, disconnected, without power, or obscured, wherein the electronic input signals includes a sensor status signal indicative of the sensor being defective, disconnected, without power, or obscured; and
    modifying or suppressing an inflation of the airbag in response to the sensor being defective, disconnected, without power, or obscured.

5. The method of claim 4, further comprising:
comparing measured parameters of the occupant to a predetermined range of occupant classes to thereby determine an occupant class of the occupant; and
modifying or suppressing the inflation of the airbag occurs when the occupant class is within the predetermined range of occupant classes and below a predetermined threshold, the occupant class is a predetermined one of the occupant classes, or the occupant is a predetermined shape or below a predetermined size or weight.

6. The method of claim 1, the method further comprising:
detecting the belted status as a buckled state of a seatbelt buckle of the seatbelt; and
detecting the unbelted status as an unbuckled state of a seatbelt buckle of the seatbelt, wherein the seatbelt usage status signal includes a signal indicative of the buckled/unbuckled state of the seatbelt buckle.

7. The method of claim 6, wherein the seatbelt includes seatbelt webbing equipped with an identifiable characteristic, the method further comprising:
detecting the identifiable characteristic via a remote sensor of the sensor suite, wherein the seatbelt usage status signal includes a seatbelt presence detection signal indicative of a detection status of the seatbelt by the remote sensor.

8. The method of claim 1, further comprising:
detecting at least one of an impact severity and an object closing speed relative to the motor vehicle; and
temporarily establishing an unsuppressed restraint state of the airbag in the first set of inflation logic of the controller and the second set of inflation logic of the controller when the impact severity or the object closing speed is above a corresponding threshold value.

9. The method of claim 1, wherein receiving the electronic input signals includes receiving an occupant signal indicative of the occupant being an animal or an object, and wherein automatically adjusting the restraint capacity setting of the airbag includes suppressing an inflation of the airbag in the restraint activation logic of the controller based on the occupant signal.

10. The method of claim 1, including providing an alert message to the one or more message recipients when automatically adjusting the restraint capacity, the alert message including an audible alert message, a visible alert message, and/or a haptic alert message.

11. The method of claim 1, the method further comprising:
suppressing activation the airbag when at least a portion of the occupant is present within the second ASZ when the occupant has the belted status; and
enabling the airbag when the at least a portion of the belted occupant is located rearward of the second ASZ.

12. The method of claim 11, further comprising:
assessing a position of the occupant having the belted status relative to a respective location of the second ASZ, via the controller, prior to at least one of a vehicle braking event, an avoidance maneuver, or an impact event; and
automatically adjusting the restraint capacity setting of the airbag using the position of the occupant having the belted status.

13. The method of claim 11, further comprising:
dynamically assessing a position of the occupant having the unbelted status relative to the location of the first ASZ;
suppressing the airbag during a predetermined event when at least a predetermined portion of the occupant having the unbelted status is located at least partially within the first ASZ, the predetermined event including one or more of a non-vehicle event, a vehicle braking event, an avoidance maneuver, and an impact event; and
enabling an inflation of the airbag during the predetermined event when the at least a portion of the occupant having the unbelted status is located rearward of the first ASZ.

14. A motor vehicle comprising:
a vehicle body defining a vehicle interior;
a seatbelt;
an airbag, wherein the seatbelt and the airbag are positioned in the vehicle interior;
a sensor suite configured to detect a position of an occupant of the vehicle interior relative to a first airbag suppression zone (ASZ) of the airbag and a second ASZ of the airbag; and
a controller operable for controlling a capacity setting of the airbag, the controller having a first set of inflation logic corresponding to an unbelted status of an occupant of the vehicle interior and a second set of inflation logic corresponding to a belted status of the occupant of the vehicle interior, wherein the controller is programmed to:
detect a position of the occupant of the vehicle interior relative to a first edge of a first airbag suppression zone (ASZ) of the airbag;
detect a position of the occupant of the vehicle interior relative to a second edge of a second ASZ of the airbag;
receive electronic input signals from the sensor suite, the electronic input signals including a seatbelt status signal indicative of a belted/unbelted status of the occupant of the vehicle interior and a position signal indicative of a position of the occupant relative to the ASZ;
execute the first set of restraint activation logic for the airbag when the occupant is an unbelted occupant and is forward of the first edge relative to the airbag, such that a location of the first ASZ is modified based on the unbelted status and the position of the occupant relative to the first edge; and
execute the second set of restraint activation logic for the airbag when the occupant is a belted occupant and is forward of the second edge relative to the airbag, such that a location of the second ASZ is modified based on the belted status and the position of the occupant relative to the second edge.

15. The motor vehicle of claim 14, wherein the controller is programmed to:
suppress activation of the airbag and provide an alert message when at least a predetermined portion of the belted occupant is present within the second ASZ; and
enable the activation of the airbag when the at least a predetermined portion of the belted occupant is located rearward of the second ASZ.

16. The motor vehicle of claim 14, wherein the controller is programmed to:
assess a position of the belted occupant relative to the second edge of the second ASZ prior to at least one of a vehicle braking event, an avoidance maneuver, or an impact event; and
automatically adjust the restraint capacity setting of the airbag using the position of the belted occupant relative to the second edge.

17. The motor vehicle of claim 14, wherein the controller is programmed to:
- dynamically assess a position of the unbelted occupant relative to a location of the first ASZ; and
- suppress activation of the airbag and provide an alert message during a predetermined event when at least a predetermined portion of the unbelted occupant is located within the first ASZ, the predetermined event including one or more of the occupant protruding into the first ASZ, a non-vehicle event, a vehicle braking event, an avoidance maneuver, and an impact event; and
- enable the inflation of the airbag during the predetermined event when the at least a portion of the unbelted occupant is located rearward of the first ASZ.

18. A method for controlling an airbag aboard a motor vehicle having a vehicle interior, a sensor suite, and a seatbelt, the method comprising:
- detecting a position of an occupant of the vehicle interior relative to a first airbag suppression zone (ASZ) of the airbag and a second ASZ of the airbag, the first ASZ having a first edge and the second ASZ having a second edge;
- receiving electronic input signals from the sensor suite, the electronic input signals including an occupant position signal indicative of the position of the occupant relative to the first edge and the second edge, and a seatbelt usage signal indicative of a belted/unbelted status of the occupant;
- automatically adjusting a restraint capacity setting of the airbag, via the controller, in response to the electronic input signals such that an airbag deployment decision of the controller is made in a first manner for an unbelted occupant having the unbelted status according to a first set of restraint activation logic based on the location of the occupant relative to the first edge of the first ASZ prior to a predetermined event;
- automatically adjusting a restraint capacity setting of the airbag, via the controller, in response to the electronic input signals such that an airbag deployment decision of the controller is made in a second manner for a belted occupant having the belted status according to a second set of restraint activation logic based on the location of the occupant relative to the second edge of the first ASZ prior to the predetermined event.

19. The method of claim 18, further comprising:
- during the predetermined event, suppressing the airbag and providing an alert message to one or more message recipients when a predetermined portion of the unbelted occupant is forward of the first edge of the first ASZ relative to the airbag or a predetermined portion of the belted occupant is forward of the second edge of the second ASZ relative to the airbag.

20. The method of claim 19, including providing the alert message to the one or more message recipients via communication of the alert message as at least one of an audible alert message, a visible alert message, or a haptic alert message.

* * * * *